United States Patent [19]

Harris et al.

[11] 4,049,955

[45] Sept. 20, 1977

[54] TEMPORARY MEMORY FOR CALCULATOR-RECORDER SYSTEM

[75] Inventors: Hal Harris; Joseph S. Foreman, Jr., both of Dallas, Tex.

[73] Assignee: Campbell Taggart, Inc., Dallas, Tex.

[21] Appl. No.: 663,288

[22] Filed: Mar. 3, 1976

[51] Int. Cl.² .............................................. G06F 3/06
[52] U.S. Cl. ............................ 235/152; 340/347 DD; 364/900
[58] Field of Search ............................ 235/152, 156; 340/172.5, 347 DD

[56] References Cited

U.S. PATENT DOCUMENTS

| | | | |
|---|---|---|---|
| 3,503,045 | 3/1970 | Wright | 340/172.5 |
| 3,715,574 | 2/1973 | Gowan | 340/347 DD X |
| 3,755,788 | 8/1973 | Finch | 340/172.5 |
| 3,774,156 | 11/1973 | Marsalka et al. | 340/172.5 |

*Primary Examiner*—Jerry Smith
*Attorney, Agent, or Firm*—Howard E. Moore

[57] ABSTRACT

A temporary memory means for a calculator-recorder system in which information related to each digit numerical data from the calculator is stored in a separate stage of a memory bank and information related to each function of a mathematical function of the calculator is stored in a separate stage of the memory bank, the numerical data, in decimal form, is converted to binary form prior to storage and reconverted to decimal form after storage, the function data, in decimal form, is converted to binary form and then reconverted to decimal form prior to storage. The transmission means can also include means for preventing the reception of additional numerical data by the recorder if a mathematical function is entered into the calculator before the recorder can receive and record all of the numerical data previously entered into the calculator.

17 Claims, 7 Drawing Figures

TEMPORARY MEMORY FOR CALCULATOR-RECORDER SYSTEM

BACKGROUND OF THE INVENTION

The present invention relates to a temporary memory means adapted to couple an electronic calculator means and a recording means. More particularly, the present invention relates to a transmission means adapted to couple an electronic calculator means and a tape punch recorder means, receive informatin in decimal form from the calculator, convert the same to another form and transmit information to the recorder; and more particularly including a lock-up means to prevent information from being transmitted from a calculator producing output data at a speed greater than it can be received by the recorder.

In the art of performing mathematical operations of data and ultimately recording the results of the mathematical operations, the means for performing the mathematical operations often can be operated to produce results faster than the means for recording the results can receive and record the same. This is particularly true where an electronic calculator means, such as a decimal-type calculator, is to be used in conjunction with a recorder means, such as a tape punch recorder. While it is desirable, in this specific arrangement, to convert information to binary form and back to decimal form, in the process of transmittal, such conersion can also be performed at a speed greater than that at which the information can be received and recorded when using slower mechanical type recorders.

It is, therefore, an object of the present invention to provide an improved transmission means for coupling a calculator means and a recorder means.

Another object of the present invention is to provide an improved transmission means for coupling a calculator means to a recorder means, which includes means for preventing the transmission of information from the calculator to the recorder at such times as the recorder is unable to receive and record such information.

A further object of the present invention is to provide an improved transmission means for coupling a calculator means to a recorder means, which includes means for preventing entry of information into the calculator at such times as the recorder is unable to receive and record such information.

Yet another object of the present invention is to provide an improved transmission means for coupling a calculator means to a recorder means, which includes means for converting information from binary form to decimal form and vice versa.

A further object of the present invention is to provide an improved transmission means for coupling an electronic calculator means to a tape punch recorder means.

Another and further object of the present invention is to provide an improved transmission means for coupling an electronic calculator, which produces information in decimal form, to a tape punch recorder means, which receives information in decimal form.

Another object of the present invention is to provide an improved transmission means for coupling an electronic calculator, which produces information in decimal form, to a tape punch recorder means, which receives information in decimal form, which includes means for preventing the transmission of information from the calculator to the recorder at such times as the recorder is unable to receive and record such information.

Another and further object of the present invention is to provide an improved transmission means for coupling an electronic calculator, which produces information in decimal form, to a tape punch recorder means, which includes means for preventing entry of information into the calculator at such times as the recorder is unable to receive and record such information.

A further object of the present invention is to provide an improved transmission means for coupling an electronic calculator, which produces information in decimal form, to a tape punch recorder means, which includes means for converting information in binary form to decimal form and vice versa.

Yet another object of the present invention is to provide an improved transmission means for coupling a calculator means, which produces information in decimal form, to a recorder means, which includes memory means.

A further object of the present invention is to provide transmission means for coupling a calculator means, which produces information in decimal form, to a recorder means, which includes memory means and means for converting information in binary form to digital form and vice versa.

Another object of the present invention is to provide transmission means for coupling a calculator means, which produces information in decimal form, to a recorder means, which includes memory means, means for converting information in binary form to digital form and vice versa and means for preventing the transmission of information from the calculator to the recorder at such times as the recorder is unable to receive and record such information.

These and other objects and advantages of the present invention will be apparent from the following description when read in conjunction with the drawings.

SUMMARY OF THE INVENTION

The present invention relates to a calculator-recorder system, wherein the output information from the calculator is in decimal form and the recorder receives and records said information, which includes information transmission means having memory bank means for temporarily storing the output information from the calculator, binary counter means for converting the output information from the calculator to information in binary form and binary to decimal decoder means for converting the information in binary form to information in decimal form prior to the receipt of said information to the recorder. Where the calculator is capable of being operated at a speed greater than the speed at which the recorder can receive and record the information from the calculator, the transmission means includes lock-up means for preventing transmission of information from the calculator to the recorder at a speed greater than the recorder can receive and record such information.

BRIEF DESCRIPTION OF THE DRAWINGS

FIG. 3 comprising

DETAILED DESCRIPTION OF THE INVENTION

Figures 1, 2, 4:
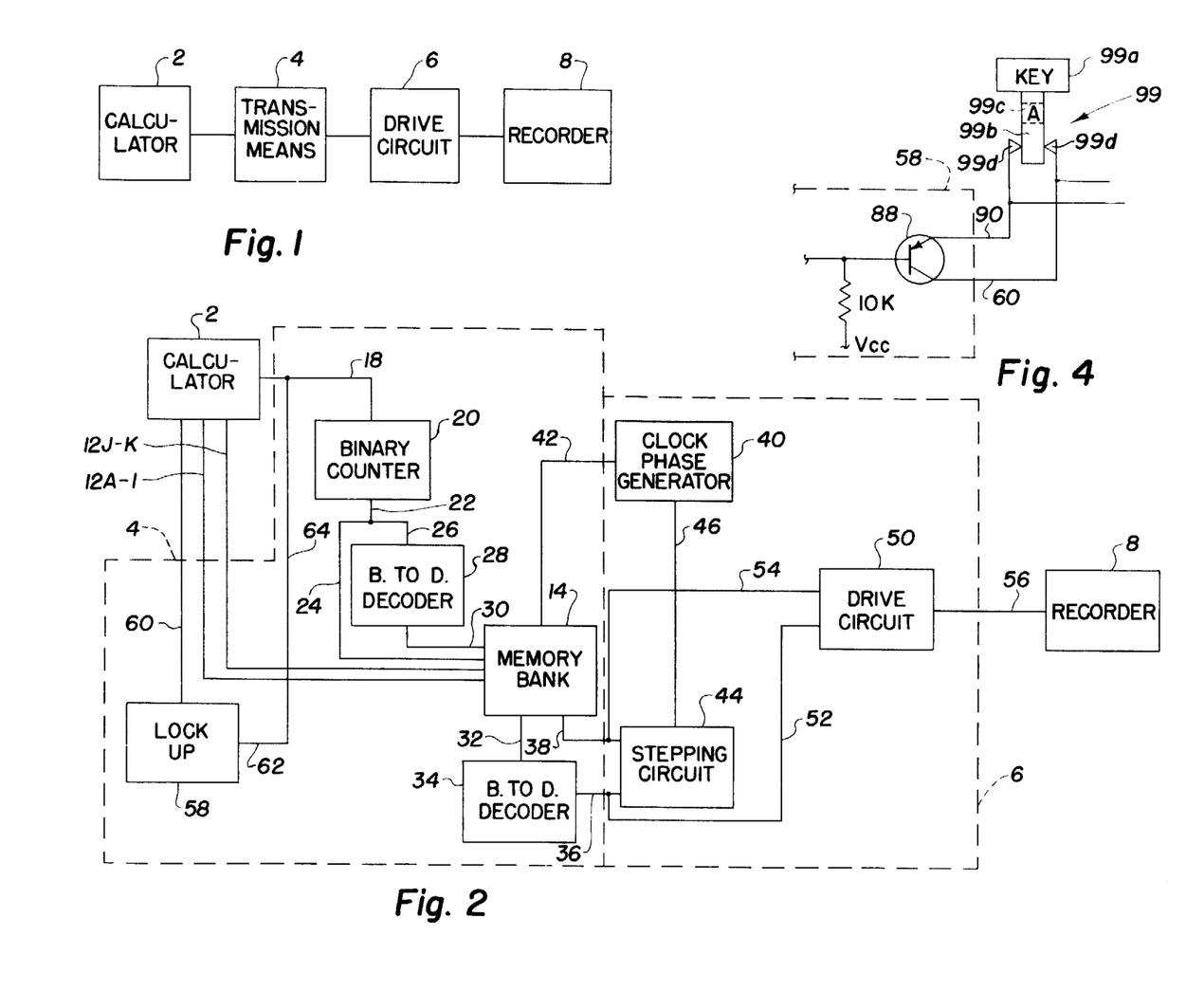
FIG. 1 illustrates, in block form, the overall calculator-recorder system of the present invention.
FIG. 2 is a more detailed block diagram of the system of FIG. 1.
FIG. 4 is an electical schematic showing the lock-up unit of the present invention connected to a key solenoid of the calculator means of the present invention.
Figure 3A:
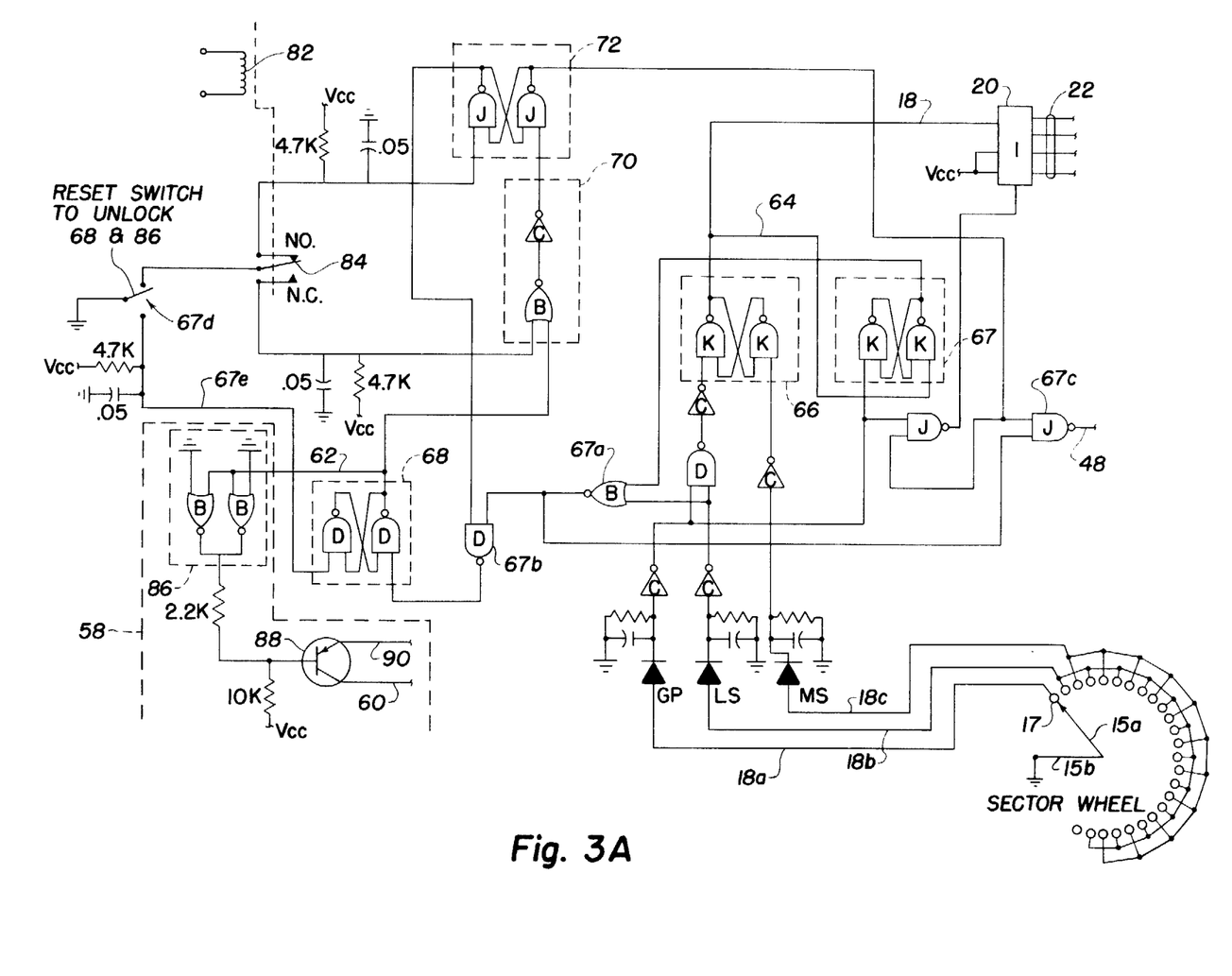
FIGS. 3A-3D is a detailed electrical schematic of the information transmission means of the present invention.
Figure 3B:
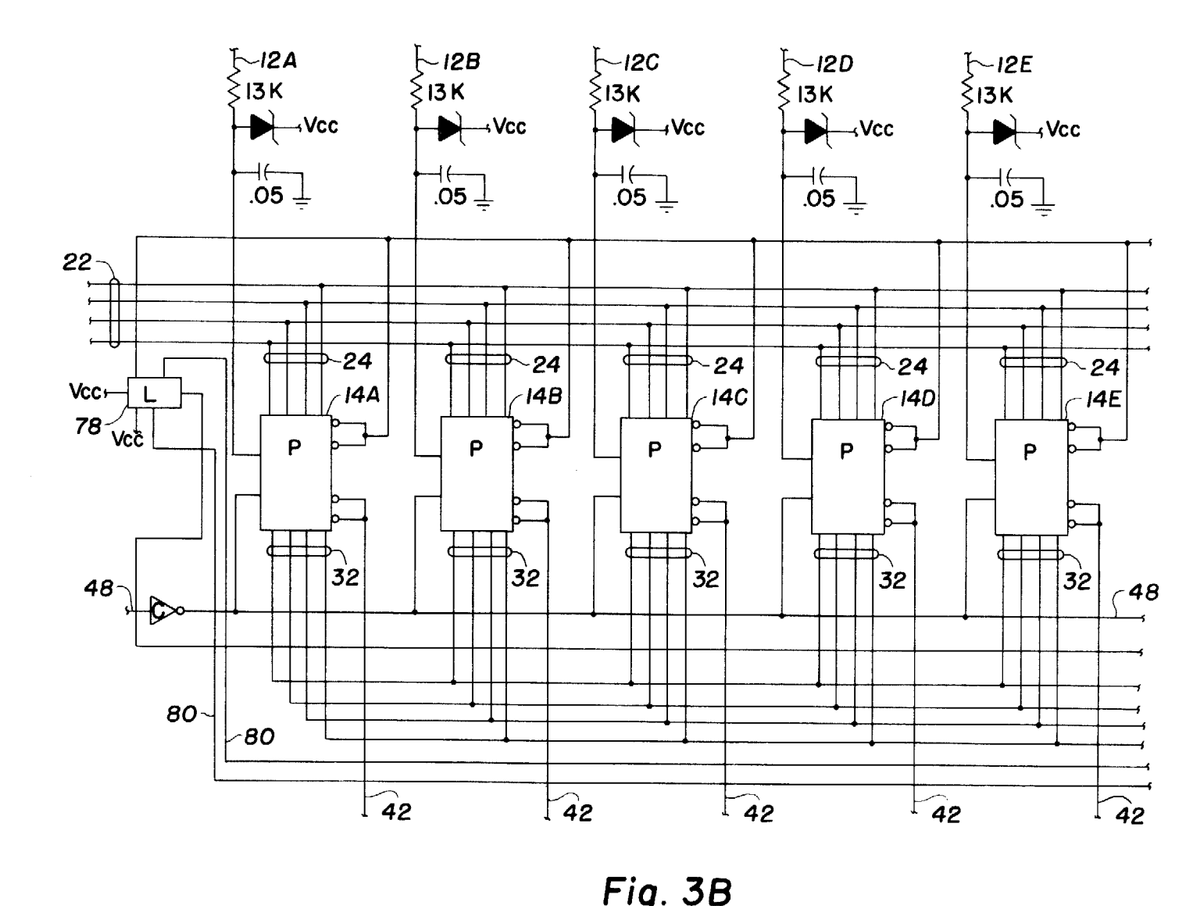
Figure 3C:
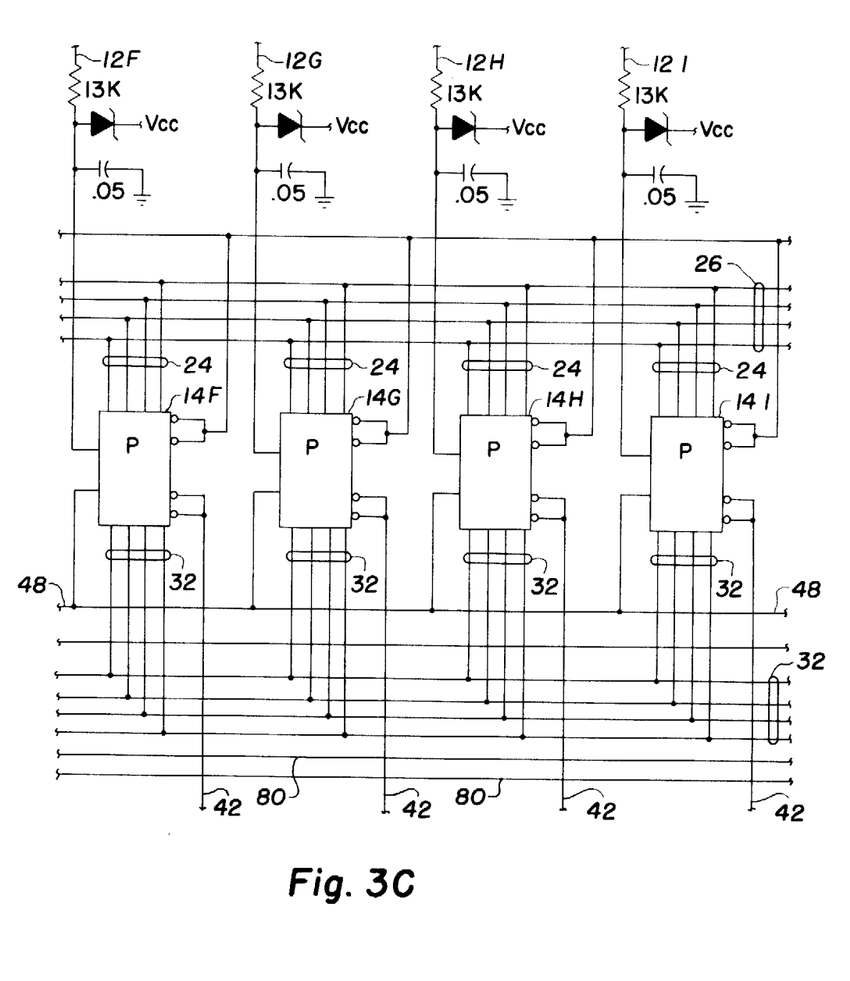
Figure 3D:
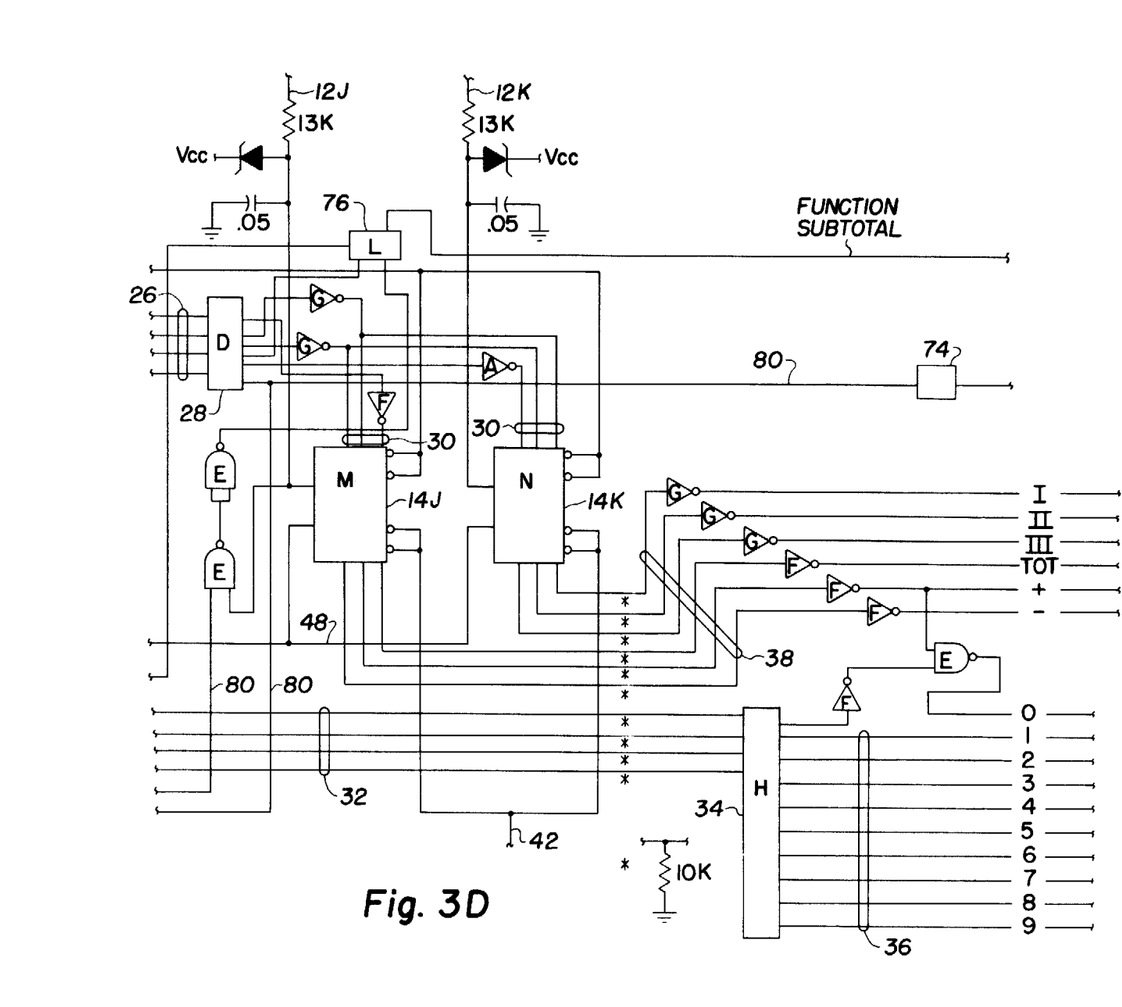

FIG. 1 shows, the block form the overall arrangement of apparatus in accordance with the present invention. Specifically, a calculator means 2 having its output operatively coupled to transmission means 4. The output of transmission means 4 is, in turn, operatively coupled to recorder drive means 6. Recorder drive means 6 is utilized to drive recorder means 8.

Calculator 2 is a typicl electronic calculator having a record paper type (not shown). To drive the solenoids to record information on the paper type, the caculator has a selector means such as a sector wheel 15. The sector wheel 15 causes information on the keys of the calculator 2 to be recorded on the type in a orderly fashion, such as all the 0's, all the 1's etc. placing the numbers in the energized digit locations.

The typical calculator 2 has keys 99 generally given a specific designation for a numeral or math function. The key 99 is generally a plastic button 99a having shaft 99b with a passage 99c formed therethrough. The contacts 99d are positioned on opposite sides of the passage such that as the button 99a is depressed the contacts 99d are spring-urged into the passage 99c making a circuit. Normally the leads to the contacts 99d are connected to the calculation memory banks. To use the calculator with a recorder 8, it is necessary to store the information intermediate of the connection to the recorder because of the speed factors.

FIG. 2 shows a block diagram of the overall computer-recorder system in greater detail.

In accordance with FIG. 2, lines 12A-I represents the nine input lines, representing the nine digits of the output of calculator means 2, to each of nine individual memory units of memory bank 14 of transmission means 4. Lines 12A-I are, of course, connected to solenoid drivers of the punch board of calculator 2. Lines 12J-K represents two input lines to each of two individual memory units of memory bank 14 and are connected to the solenoid drivers of the function keys of calculator 2 that are used in connection with mathematical calculations, such as plus, minus, etc.

A sector wheel 15, located in calculator 2, is divided into small sections each of which have contacts 17 which corresponds to one of the ten digits of the decimal system 0-9.

The sector wheel 15 comprises a small rotatable rotor arm 15a connected to ground by line 15b. Contacts 17 are spaced apart in each section along the arc of rotor arm 15a. As the rotor arm is stepped across the contact by motor means (not shown) a signal representing a number is passed along lines 18a, 18b, and 18c. As the rotor arm 15a moves off of contact 17 connected to line 18a, the rotor arm 15a alternately contacts the connections to lines 18b and 18c which causes the binary counter 20 to count by sending signals through flip-flop latch 66. When the first section of the sector wheel is in operative position, for example, it looks for all the numeral 0's that have been punched on the calculator. If a 0 or 0's has been entered, as indicated, the solenoid for the digit place is energized sending a signal through lines 12A-I to enable the memory bank 14 to receive data from the binary counter 20 through line 24. Information is fed the binary counter 20 from sector wheel 15 through line 18 as hereinafter explained. The numerical data, in binary form is then fed to the appropriate one of the nine memory units of memory bank 14 through four lines 24. The second section, corresponding to the numeral 1, of the sector wheel is then rendered operative, looks for all the numeral 1's entered, actuates the solenoid for that digit, sends a signal through lines 12A-I to enable memory bank 14. This procedure is then repeated for all ten numerals and function key. The binary number is entered into each of four locations of each individual memory unit of memory bank 14, i.e., 1 = 0001, 2, − 0010, etc. When one of the mathematical function solenoid is energized in calculator 2, a signal is then transmitted to binary counter 20 through line 18 to cause the previously entered figures to be stored in memory bank 14. In counter 20 the mathematical function is transposed into a special binary number, transmitted through lines 22 and four binary data lines 26 to binary to decimal decoder 28 and thence, in decimal form to one of the two individual function storage units of memory bank 14 through lines 30.

When called for, as explained hereinafter, binary data, representing the stored numerical data, is withdrawn from the nine memory units of memory bank 14 through four binary data lines 32, is converted to decimal form in binary to decimal decoder 34 and is then passed to the recorder drive means 6 through decimal data lines 36. Similarly, the stored function data is withdrawn from the two function storage memory units of memory bank 14 through decimal data lines 38 and is passed to recorder drive means 6.

Clock phase generator 40 of recorder drive means 6 is driven by an oscillator means (not shown). As the clock phase generator advances through each of nine steps, it sends a signal to the appropriate one of the numerical data memory units of memory bank 14 and on its tenth step to either of the two function data memory units of memory bank 14, all through lines 42. At the same time, clock phase generator 40 advances an integrated circuit board stepping circuit 44, through line 46, by one increment or pin. Stepping circuit 44 calls out numerical data from the nine numerical data memory units of memory bank 14, through lines 36, and function data from the two function data memory units of memory bank 14, as it is advanced through twelve increments.

In the first increment the drive circuit 6 compares the entered function to determine validity of the function. If invalid, the circuit 6 stops recorder 8. If valid, the circuit 6 steps through the memory locations 14A-I, then the last increment retreives and records the actual function used.

A significant feature of transmission means 4 is lock-up unit 58. Lock-up unit 58 is connected to one of the keys of calculator 2 through lines 60 and 90, to the memory bank 14 through line 62 and to the sector signal line 18 through line 64. In operation, the lock-up unit locks out the calculator unit 2 (in the specific illustration being discussed Calculator 2), thus preventing further response of the recorder in order to, in turn, prevent the operator of the calculator 2 from exceeding the input speed of the recorder 8, thus preventing misarrangement of the data. FIG. 3 comprising FIGS. 3A-3D is a detailed electrical schematic of the transmission means 4 of the calculator-recorder system.

In FIG. 3, numerical data is transmitted from the binary counter 20 through four input lines 24 one for each of the four input lines to the numerical data memory units 14A through 14I, respectively. Memory units 14A through 14I are integrated circuits commercially available through various manufacturers. Input lines 12J and 12K are connected to the solenoid drivers of the function keys of the calculator and enable memory locations M and N to receive data from binary counter 20 through decimal decoder 28.

A signal generated by the sector wheel of the calculator is passed to the transmission means through lines 18 to latch circuit 66, a nandgate flip-flop shifting alternately with the sector wheel the signal to the 4-bit binary counter 20. The binary counter 20 positions the respective number in the respective energized memory units 14A through 14I. The circuits 14A-14I are energized by the respective solenoid keys connected by lines 12A-12I.

Line 64 connects the output signal from latch 66 to a second latch 67 which memorizes the sector wheel which is in motion and enables one side of nor gate 67a. Latch 72 is energized by relay 84 and memorizes that the motor is running. The signal from nor gate 67a by latch 67 enables nand gate 67b to prohibit a signal from motor latch 72 from being read by latch 68. On the second pass if motor latch 72 has not been energized to reset batch 67, the signal from LS line 18 and latch 67 is pass through nor gate 67a to enable nand gate 67b. This signal energizes latch 68 which passes through lines 62 to inverter 86. The signal is then conducted to the base of transistor 88. The voltage across the base of transistor 88 grounds the transistor and shorts lines 60 and 90 connected to any one of the typical keys 99 on the calculator 2 preventing further enerization of the keys 99 on the calculator. If signals from the sector wheel 15 indicates that the wheel is stopped, and signals from latch 72 indicate the motor is stopped, then this enables nand gate 67c to reset memory banks 14 and latch 76 and 78.

If transistor 88 is biased to lockup further transmission of data to the recorder 8, reset switch 67d is energized to send a signal through line 67e to reset latch 68 to the disabled position.

When binary counter 20 has stepped through the ten digits with decoder 28, cam start 74 is energized through line 80 connected to the last step of decoder 28 and cam start 74 energizes the motor.

The circuit is connected to a power supply through lines labeled Vcc which may be 4.7 volts D.C.

As previously explained in connection with FIG. 2, the drive circuit 6 energizes memory units 14A through 14I through lines 42. This causes the numerical data in binary form to be transferred through lines 32 to binary to decimal decoder 34. The numerical data, in decimal form, is transitted through one of the ten lines 36, corresponding to digits 0-9, to the tape punch drive means 6 to actuate the punching circuits. The cam start 74 actuates the motor start relay 82 to start the punch motor in the tape punch recorder.

The operation of lock-up unit 58 will now be explained with reference to FIGS. 3 and 4.

When a signal is generated by the sector wheel of the calculator, latch circuit 66 is caused to be in an energized condition. If a second signal from the sector wheel occurs before relay 84 resets latch circuit 72, the signal is passed from latch 67, through nor gate 67a, nand gate 67b to latch circuit 68 which will then pass the signal through dual driver inverter 86. Inverter 86 biases the base of transistor 88 to ground, allowing a flow through lines 60 and 90 to short the solenoid 92 of one of the calculator keys. With transistor 88 biased, thus shortening solenoid 92 of the function key of the calculator, further response of the tape punch recorder 8 is prevented or the other keys are made inoperative by the short. Thus, the operator is prevented from operating the calculator 2 at a speed greater than the information can be assimilated and recorded by the recorder.

An understanding of the drawings will be facilitated by the following Schedule I which lists the Part No. of conventional units, which are the same for all manufacturers, together with their description. The units referred to are marked in the drawings by a reference letter in the center of the unit.

Schedule I

| Drawing Designation | Part No. | Description |
|---|---|---|
| A | SN 74C04 | Hex Inverter |
| B | SN 74C02 | Quadruple, 2-input nor gate |
| C | SN 74C04 | Hex Inverter |
| D | SN 74C00 | Nand gate used as latch |
| E | SN 74C00 | Nand gate* |
| F | SN 74C04 | Hex Inverter |
| G | SN 74C04 | Hex Inverter |
| H | SN 74C42 | 4 line to 10 line BCD to decimal converter binary to decimal decoder |
| I | SN 74C193 | Binary counter |
| J | SN 74C00 | Nand gate* |
| K | SN 74C00 | Nand gate* |
| L | SN 74C74 | D-type flip-flop |
| M | SN 74C173 | 4-Bit, D-type register |
| N | SN 74C173 | 4-Bit, D-type register |
| O | SN 74C42 | Binary decimal decoder |
| P | SN 74C173 | 4-Bit, D-type registers |

*All nand = quadruple, 2-input positive nand gates

While specific embodiments of the present invention have been illustrated and described, it is to be understood that these embodiments are not to be considered limiting and the present invention is to be limited only in accordance with the appended claims.

Having described my invention, I claim:

1. In a calculator-recorder system, wherein the output information from the calculator is in decimal form and the recorder receives and records said information, the improvement comprising; information transmission means for transmitting said output information from said calculator to the input of said recorder, including; memory bank means for temporary storing said output information, the memory bank means having nine stages for storing the numerical data portion of the output information from the calculator and two stages for storing the function data portion of the output information from the calculator; binary counter means for converting said output information from said calculator to information in binary form prior to storage in the nine stages of the memory bank; and a pair of binary to decimal decoders, said numerical data information in binary form is converted to information in decimal form after retrieval from said nine stages of said memory bank by a first of said pair of binary to decimal decoders, the function data portion of said output information from said calculator is converted to information in binary form by said binary counter means and said function data in binary form is reconverted to decimal form prior to the storage in two stages of said memory bank by the second of said pair of binary to decimal decoders.

2. In a calculator-recorder system, wherein the output information from the calculator is in decimal form and the recorder receives and records said information, said calculator having a sector wheel means having a sector for each of the digits of the decimal system and sequentially scans the calculator input for all of each digit entered into said calculator, the improvement comprising; information transmission means for transmitting said output information from sid calculator to the input said of said recorder, including; memory bank means for temporarily storing said output information, the memory bank having a memory stage for each of said digits of said decimal system; binary counter means for converting said output information from said calculator to information in binary form, wherein said sector wheel means generates a signal for each of said digits entered into said calculator and sends said signal through the binary counter means to activate the corresponding one of said memory stages and enter into said corresponding memory stage the total number of said each digit which has been entered into said calculator; and binary to decimal decoder means for converting said information in binary form to information in decimal form prior to the reception of said information by said recorder.

3. A system in accordance with claim 2 wherein the binary counter includes means for converting each mathematical function signal from said calculator into a distinct binary number, the memory bank includes a memory stage for said each mathematical function and said each mathematical function signal passes through said binary counter and said decimal decoder to activate the corresponding one of said memory stages and enter into said corresponding memory stage information representative of said each mathematical function.

4. A system in accordance with claim 3 wherein the binary to decimal decoder means is a pair of binary to decimal decoders and the distinct binary number signal for each mathematical function from the binary counter passes through one of said pair of binary to decimal decoders prior to entry in the corresponding memory stage and is converted to a signal in decimal form in said one of said pair of binary to decimal decoders.

5. A system in accordance with claim 4 wherein the transmission means includes a cam start means and the mathematical function signal from the calculator energizes said cam start means to in turn activate the corresponding memory stage.

6. A system in accordance with claim 5 wherein the recorder includes drive circuit means for energizing the memory stages for each digit of the decimal system and causing the information stored in said memory stages to pass to said recorder.

7. A system in accordance with claim 6 wherein the transmission means includes a motor start relay means for starting the recorder and the cam start means actuates said motor start relay means.

8. A system in accordance with claim 7 wherein the recorder is a tape punch recorder.

9. A system in accordance with claim 7 wherein the information stored in the memory stages passes through a second of the pair of binary to decimal decoders prior to passage to the recorder.

10. A system in accordance wit claim 6 wherein the drive circuit means includes a stepping means for sequentially energizing each of the memory stages for each digit of the decimal system and reset means for resetting the memory bank and readying the same for storage of the next group of numbers from the calculator and said reset means sends a reset signal to said memory bank after sequentially energizing all of said memory stages for all of said digits of said decimal system.

11. In a calculator-recorder system, wherein the output information from the calculator is in decimal form and the recorder receives and records said information, the improvement comprising: information transmission means for transmitting said output information from said calculator to the input of said recorder, including; a cam start means for receiving and being energized by a signal from a key of the calculator; a motor start relay means for starting the recorder; memory bank means for temporarily storing said output information, the memory bank having a separate memory stage for storing information corresponding to each digit of the numerical data portion of the output information from the calculator and a separate memory stage for storing information corresponding to each function of the function data portion of the output information from the calculator; the recorder means includes retrieval means for sequentially withdrawing information from each of said memory stages representing digits of said numerical data, binary counter means for converting said output information from said calculator to information in binary form, and binary to decimal decoder means for converting said information in binary form to information in decimal form prior to the reception of said information by said recorder; reset means operatively coupled to said motor shaft relay for generating a reset signal after said numerical data has been withdrawn from all of said memory stages storing said information corresponding to said each digit of said numerical system and resetting said motor start relay and memory stages representing digits of said numerical data to ready said memory stages for a new set of numerical data, and lock-up means operatively coupled to said key of said calculator and said motor start relay to prevent the reception of additional data by said recorder when a signal from said key is generated prior to the resetting of said motor start relay and said numerical data stages of said memory bank.

12. A system in accordance with claim 11 wherein the lock-up means is coupled to the mathematical function key through a transistor means and the generation of a signal from a key prior to the resetting of said motor start relay and said numerical data stages of said memory bank shorts said mathematical function key to ground.

13. A system in accordance with claim 12 wherein the generation of a signal from said key prior to the resetting of the motor start relay and the numerical data stages of the memory bank results in biasing said transistor to short circuit a key of the calculator preventing further data input.

14. In a calculator-recorder system, wherein the calculator is capable of being operated at a speed greater than the speed at which the recorder can receive and record the output information from the calculator, the improvement comprising; information transmission means operatively coupling the output of said calculator to the input of said recorder, including; transistor means operatively coupled to a key of the calculator; and a shortening means operatively coupled to said transistor to bais the base of said transistor to ground when the calculator is operated at a speed greater than the speed at which the recorder can receive and record the output information from said calculator.

15. In a calculator-recorder system, wherein the calculator is capable of being operated at a speed greater than the speed at which the recorder can receive and record the numerical data of the output information from the recorder, the improvement comprising; information transmission means operatively coupling the output of said calculator to the input of said recorder and including: a cam start means for receiving and being energized by a signal from a mathematical function key of the calculator and a motor start relay means for starting the recorder; a memory bank means including a separate memory stage for storing information corresponding to each digit of the numerical data portion of the output information from the calculator and a separate memory stage for storing information corresponding to each function of the function data portion of the output information from the calculator; retrieval means in said recorder means for sequentially withdrawing information from each of said memory stages representing digits of said numerical data; reset means operatively coupled to said motor start relay for generating a reset signal after said numerical data has been withdrawn from all of said memory stages storing said information corresponding to said each digit of said numerical data and resetting said motor start relay and said memory stages representing digits of said numerical data to ready said memory stages for a new set of numerical data; and lock-up means operatively coupled to said key of said calculator and said motor start relay to prevent the reception of additional data by said recorder when a signal from said key is generated prior to the resetting of said motor start relay and said numerical data stages of said memory bank.

16. A system in accordance with claim 15 wherein the lock-up means is coupled to a key through a transistor means and the generation of a signal from a key prior to the resetting of said motor start relay and said numerical data stages of said memory bank shorts said key to ground.

17. A system in accordance with claim 16 wherein the generation of a signal from a key prior to the resetting of the motor start relay and the numerical data stages of the memory bank results in shorting the key by the switching of the transistor thereby preventing further data input.

* * * * *